United States Patent
Wen

(10) Patent No.: US 7,996,817 B1
(45) Date of Patent: Aug. 9, 2011

(54) AUTOMATIC VALIDATION OF TEST RESULTS USING COMPONENTIZED SOFTWARE OBJECT REFLECTION

(75) Inventor: Bin Wen, Ocean, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1189 days.

(21) Appl. No.: 11/588,751

(22) Filed: Oct. 27, 2006

(51) Int. Cl.
*G06F 9/44* (2006.01)
*G06F 9/45* (2006.01)

(52) U.S. Cl. .................... 717/124; 717/114; 717/137

(58) Field of Classification Search .................... None
See application file for complete search history.

(56) References Cited

U.S. PATENT DOCUMENTS

| | | | | |
|---|---|---|---|---|
| 7,444,622 | B2 * | 10/2008 | Grieskamp et al. | 717/124 |
| 7,543,275 | B2 * | 6/2009 | Kuturianu et al. | 717/124 |
| 7,890,928 | B2 * | 2/2011 | Patrudu | 717/114 |
| 2003/0158911 | A1 * | 8/2003 | Lou et al. | 709/218 |
| 2004/0205565 | A1 * | 10/2004 | Gupta | 715/513 |
| 2007/0016672 | A1 * | 1/2007 | Wilson et al. | 709/224 |
| 2008/0120607 | A1 * | 5/2008 | Dippel | 717/137 |

OTHER PUBLICATIONS

"A need for componentized transport protocols", Condie et al., Oct. 2005, pp. 1-10, <http://delivery.acm.org/10.1145/1120000/1118617/a08-condie.pdf>.*
"A Java framework for the static reflection, composition and synthesis of software components", McRitchie et al., Jun. 2003, pp. 19-20, <http://delivery.acm.org/10.1145/960000/957296/p19-mcritchie.pdf>.*
"Using reflection for querying XML documents", Kirchberg et al., Jan. 2006, pp. 1-10, <http://delivery.acm.org/10.1145/1160000/1151749/p119-kirchberg.pdf>.*

* cited by examiner

*Primary Examiner* — Thuy Dao
(74) *Attorney, Agent, or Firm* — Chapin IP Law, LLC; David W. Rouille, Esq.

(57) ABSTRACT

A method, apparatus and computer program product for providing automatic validation of test results using componentized software object reflection, is presented. An application is run and at least one resultant data structure is generated from the running of the application. The at least one resultant data structure is converted in to at least one componentized software object. Results are obtained from the at least one componentized software object and the results from the at least one componentized software object are verified.

21 Claims, 3 Drawing Sheets

AUTOMATIC VALIDATION OF TEST RESULTS USING COMPONENTIZED SOFTWARE OBJECT REFLECTION

BACKGROUND

The testing of applications can be cumbersome and tedious. In response to this, methods have been developed for providing automatic testing of applications. The automatic testing applications produce applications, which test an application by examining the application and providing tests that exercise the application in order to verify proper operation of the application. For example, an automatic test application program may determine the variables and methods used by the application being tested, generate code to test the application, and verify the results of the testing.

Application Enablement Services (AES) provides an enhanced set of Application Programming Interfaces (APIs), protocols and web services that expose the functionality of communication solutions to corporate application developers, third party Independent Software Vendors (ISVs) and system integrators. Application Enablement Services provides an open platform for supporting existing applications and is the catalyst for creating the next generation of applications and business solutions for our customers. When developing AES based products and services, it is necessary to test the products and services in order to verify proper operation of these product and services.

SUMMARY

Conventional mechanisms such as those explained above suffer from a variety of deficiencies. One such shortcoming is that in order to automate tests for applications such as AES through their client libraries written in C, a problem exists in that all API based software written in C or C++, produces results in C structures, like telephony services application programming interface (TSAPI), Adjunct-Switch Application Interface (ASAI), and CallVisor Local Area Network (CVLAN) services.

In order to validate the result by a program, the expected results need to be hard coded in C structures in the test program. Also in certain scenarios only certain fields in the C structure needs to be validated. A generic way to identify the fields in a structure is to use offset value of the fields in the structure. To hard code these offset values is tedious and error prone work. If the test parameters are changed, the test program needs to be changed and recompiled. All these changes require a test engineer to have profound knowledge of C programming and can prove to be labor intensive as well as costly.

Embodiments of the invention significantly overcome such deficiencies and provide mechanisms and techniques that provide automatic validation of test results using componentized software object reflection. The test program converts the C structures into an Extensible Markup Language (XML) format. A validation program (for example written in Java) reads the result in XML and recreates the structures into componentized software objects (e.g. Java components). Then the program reads a specification file (which also could be in XML format), which contains field names (rather than offset value of the fields) in the structures that need to be checked and also include what values are expected. The java program then uses reflection to look up the fields in the componentized software objects and check the values in it in order to verify proper operation.

The benefit of using reflection is that the validation program can be written in a generic way that can validate any structures produced by the C program. If the testing parameters are changed, only the specification file needs to be changed, and there is no need to recompile the validation program. The specification files are more human friendly than C programs, and the test engineer does not need any C programming knowledge to reconfigure the test suites.

In a particular embodiment of a method for providing automatic validation of test results using componentized software object reflection, the method begins with running an application and generating at least one data structure. The method includes generating at least one resultant data structure from the at least one data structure. The method further includes converting the at least one resultant data structure in to at least one componentized software object. Further still, the method includes obtaining results from the at least one componentized software object and verifying the results.

Other embodiments include a computer readable medium having computer readable code thereon for providing automatic validation of test results using componentized software object reflection. The computer readable medium includes instructions for running an application and generating at least one data structure. The computer readable medium further includes instructions for generating at least one resultant data structure from the at least one data structure. The computer readable medium also includes instructions for converting the at least one resultant data structure in to at least one componentized software object, and instructions for obtaining results from the at least one componentized software object. The compute readable medium also includes instructions for verifying the results from the at least one componentized software object.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides automatic validation of test results using componentized software object reflection as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing automatic validation of test results using componentized software object reflection as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya Inc. of Lincroft, N.J.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Componentized software is software that is designed to allow different pieces of the application, or "objects", to be created separately but still to have the objects work together. For this to happen, the objects must have standard interfaces that can be understood and accessed by other objects. The software language enforces some parts of these interfaces. If software interfaces are not directly available as part of the system, a discovery mechanism is employed to find the interface information. If the interfaces are not used, the software objects will not be able to work with other objects. Other practices are imposed by convention. Because these programming practices are known to everyone, the companies that create the containers can rely on them when creating the container. As a result, if these practices are not followed, the container might not operate properly. Thus, there is an indirect mechanism for enforcing these practices.

Using the reflection, a program can determine what are known as the "properties" and "methods" of a componentized software object. The properties of a componentized software object describe the data types and attributes for a variable used in the componentized software object. Every variable used in the componentized software object has a property associated with it. In this way, the software can automatically determine what methods need to be exercised to test a componentized software object and the variables that need to be generated in order to provide stimulus to the methods.

The methods of a componentized software object describe the functions that componentized software object can perform. Part of the description of the method is the properties of the variables that are inputs or outputs to the method. A second part of the description of each method—which can also be determined through the reflection interface—is the command needed to invoke this method. The detailed description of the method's name, parameters and return value is specified in Remote or Home interfaces and can be also determined with Reflection API available in Java language itself. Because software can determine the code needed to invoke any method and can generate data values suitable to provide as inputs to that method, the software can generate code to call any method in the componentized software object.

Figure 1:
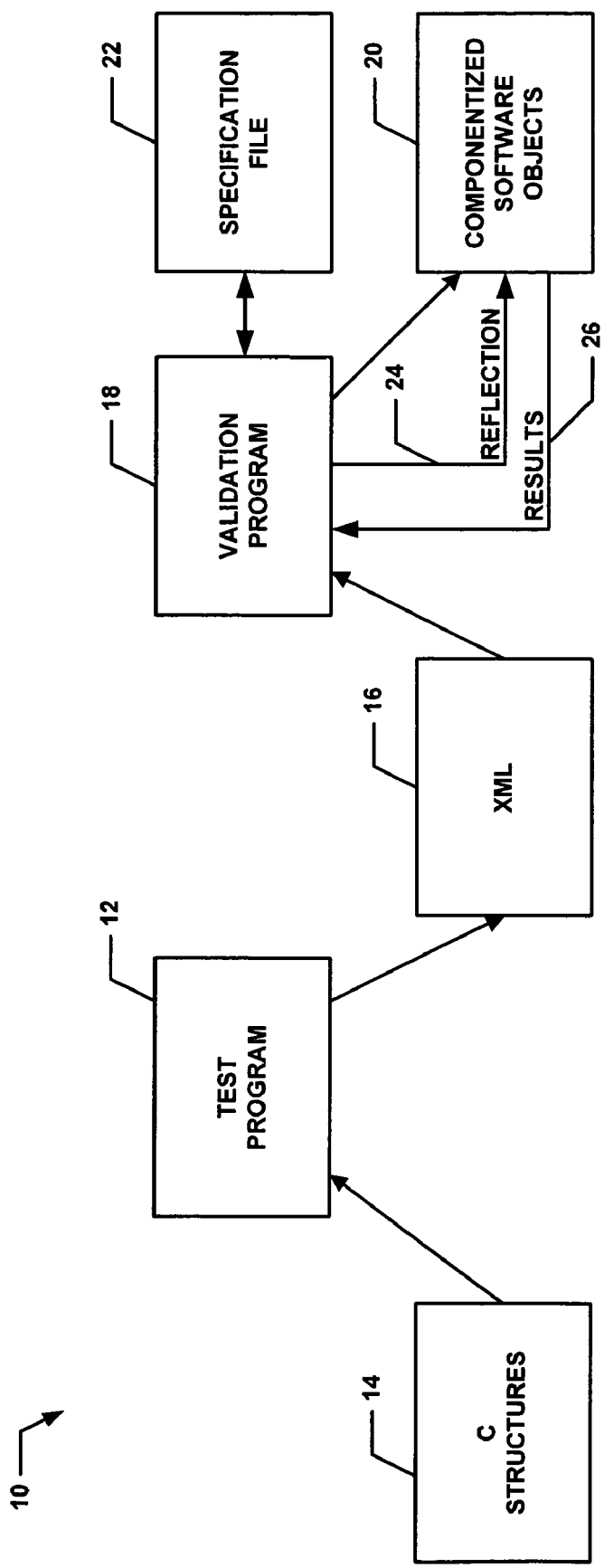
FIG. 1 depicts a block level diagram of the objects used to perform automatic validation of test results using componentized software object reflection.

Referring now to FIG. 1, a block diagram of an environment 10 used to perform automatic validation of test results using componentized software object reflection is shown. The environment includes a test program 12 in communication with C structures 14 and XML structures 16. The test program 12 converts the C structures 14 into XML format 16. The C structures 14 may be the result of API based software written in C or C++ such as applications like AES, although it should be understood that the invention relates to any type of data structure and is not limited to only C structures.

The environment 10 used to perform automatic validation of test results using componentized software object reflection also includes a validation program 18. The validation program 18 reads the result in XML generated by test program 12 and recreates the structures into componentized software objects 20. In a particular embodiment the validation program is also written in Java.

The validation program 18 reads a specification file 22 that contains field names (rather than offset value of the fields) in the structures that need to be checked and the values that are expected. The specification file 22 could be in XML format.

The validation program 18 then uses reflection 24 to look up the fields in the componentized software object objects 20 and check the values 26 in the componentized software object. The benefit of using reflection is that the validation program 18 can be written in a generic way that can validate any structures 14 produced by the C program. If the testing parameters are changed, only the specification file 22 needs to be changed. There is no need to recompile the validation program 18. The specification files 22 are more human friendly than C programs. The test engineer does not need any C programming knowledge to reconfigure the test suites.

Figure 2:
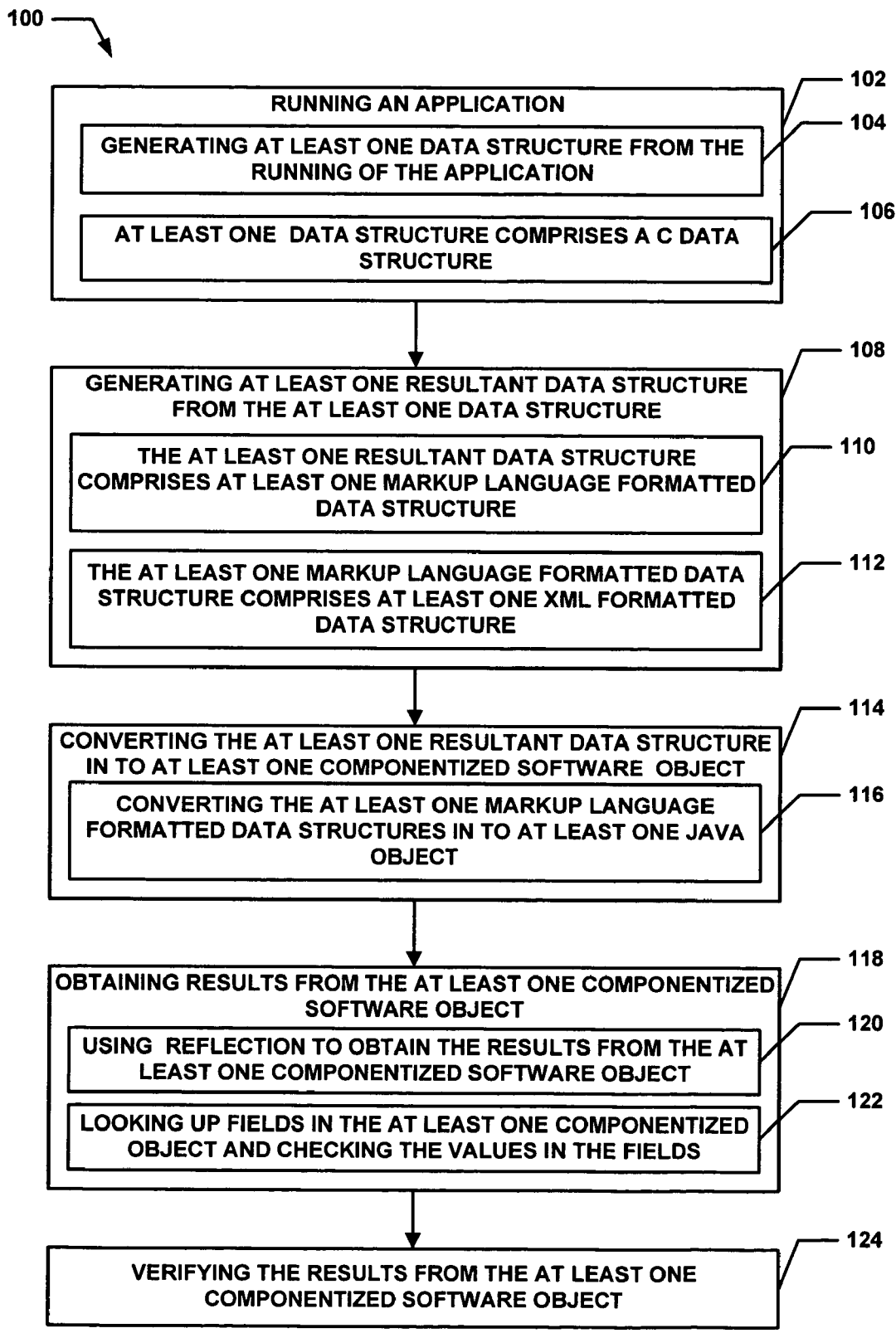
FIG. 2 depicts a flow diagram of a particular embodiment of a method of performing automatic validation of test results using componentized software object reflection.

A flow chart of the presently disclosed method is depicted in FIG. 2. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 2, a particular embodiment of a method 100 of providing automatic validation of test results using componentized software object reflection begins with processing block 102 that discloses running an application. The application may be an Application Enablement Services which produces results in C structures such as like telephony services application programming interface (TSAPI), Adjunct-Switch Application Interface (ASAI), and CallVisor Local Area Network (CVLAN) services structures. As further shown in processing block 104, the running of an application further includes generating at least one data structure. As further shown in processing block 106, in a particular embodiment the data structure is a C data structure.

Processing block 108 states generating at least one resultant data structure from the at least one data structure. As shown in processing block 110 the resultant data structure comprises at least one markup language formatted data structure. As further shown in processing block 112 in one example this includes wherein the markup language formatted data structure comprises an XML formatted data structure.

Processing continues with processing block 114 which recites converting the at least one resultant data structure in to at least one componentized software object. As recited in processing block 116 the at least one markup language formatted data is converted in to at least one Java object. As an example, a validation program (for example written in Java) reads the result in XML and recreates the structures into componentized software objects (e.g. Java components). Then the program reads a specification file (which also could be in XML format) that contains field names (rather than offset value of the fields) in the structures that need to be checked and also include what values are expected.

Processing continues with procession block 118, which discloses obtaining results from the at least one componentized software object. Processing block 120 further recites wherein the obtaining results from the at least one componentized software object comprises using reflection to obtain the results from the at least one componentized software object. This may also include, as shown in processing block 122 wherein the using reflection to obtain the results from the at least one componentized software object comprises looking up fields in the at least one componentized software object and checking the values in the fields.

Processing block 124 recites verifying the results from the at least one componentized software object. In continuing with the example above, the java program then uses reflection to look up the fields in the componentized software objects and check the values in it in order to verify proper operation.

Figure 3:
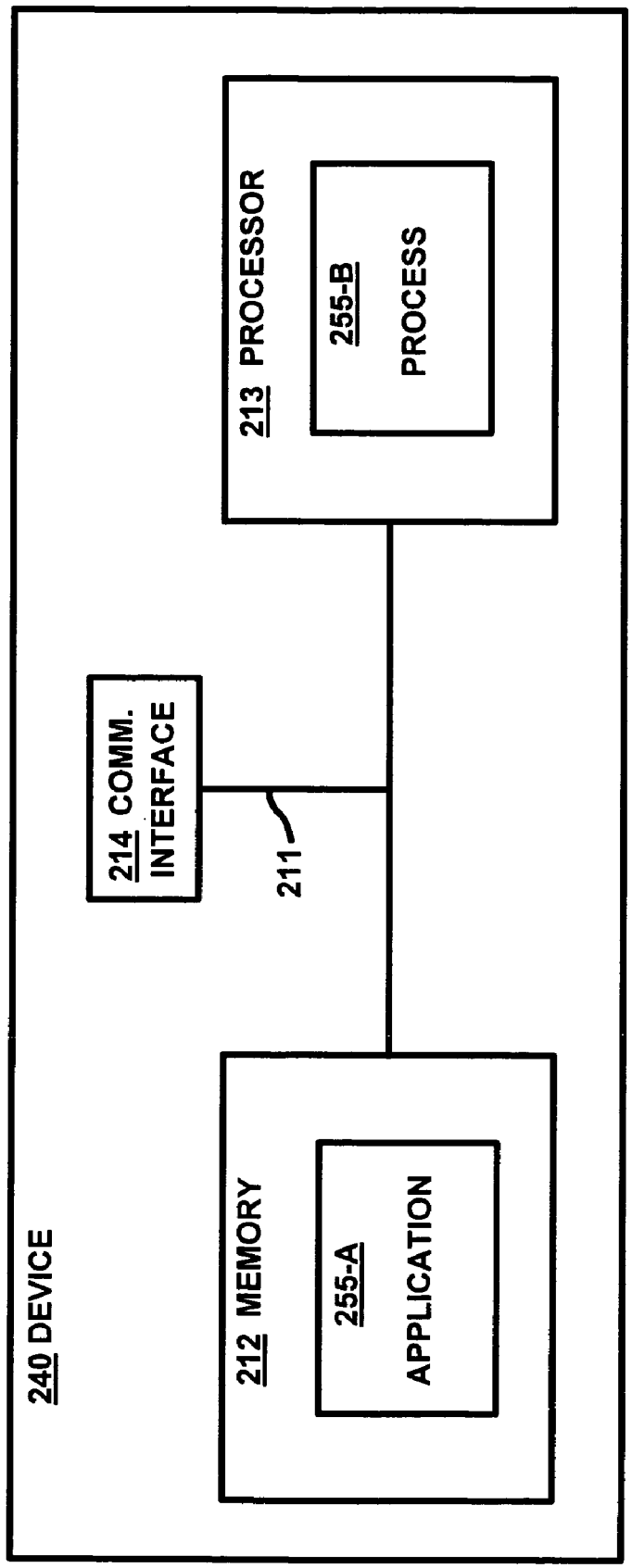
FIG. 3 illustrates an example computer system architecture for a computer system that performs automatic validation of test results using componentized software object reflection in accordance with embodiments of the invention.

FIG. 3 illustrates example architectures of a computer system that is configured as a host computer system 240. The computer system 240 may be any type of computerized system such as a personal computer, workstation, portable computing device, mainframe, server or the like. In this example, the system includes an interconnection mechanism 211 that couples a memory system 212, a processor 213, and a communications interface 214. The communications interface 214 allows the computer system 240 to communicate with external devices or systems.

The memory system 212 may be any type of computer readable medium that is encoded with an application 255-A that represents software code such as data and/or logic instructions (e.g., stored in the memory or on another computer readable medium such as a disk) that embody the processing functionality of embodiments of the invention for the agent 255 as explained above. The processor 213 can access the memory system 212 via the interconnection mechanism 211 in order to launch, run, execute, interpret or otherwise perform the logic instructions of the applications 255-A for the host in order to produce a corresponding agent process 255-B. In other words, the process 255-B represents one or more portions of the agent application 255-A performing within or upon the processor 213 in the computer system. It is to be understood that the agent 255 operate as explained in former examples are represented in FIG. 5 by the agent application 255-A and/or the process 255-B.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method of providing automatic validation of test results using componentized software object reflection, the method comprising:
   running an application, said running an application resulting in the generation of at least one data structure, wherein the at least one data structure comprises a data structure written in a high-level programming language;
   generating at least one resultant data structure from the at least one data structure, wherein the at least one resultant data structure comprises at least one markup language formatted data structure;
   converting the at least one resultant data structure into at least one componentized software object, wherein the at least one componentized software object includes at least one field containing a value;
   obtaining results from the at least one componentized software object, wherein the obtaining results from the at least one field of the at least one componentized software object comprises using reflection to obtain the results from the at least one componentized software object and to validate any software structures produced by a program written in the high-level language; and verifying the results from the at least one componentized software object.

2. The method of claim 1 wherein the generating at least one resultant data structure from the at least one data structure comprises converting the at least one data structure into at least one markup language formatted data structure.

3. The method of claim 2 wherein said converting the at least one resultant data structure into at least one componentized software object is performed by a validation program.

4. The method of claim 1 wherein said generating at least one resultant data structure is performed by a test program.

5. The method of claim 1 wherein the using reflection to obtain the results from the at least one componentized software object comprises looking up fields in the at least one componentized software object and checking the values in the fields.

6. The method of claim 1 wherein at least one data structure comprises a C data structure, and wherein said at least one resultant data structure comprises an Extensible Markup Language (XML) data structure.

7. The method of claim 1 wherein said componentized software object comprises a Java® component.

8. A non-transitory computer readable medium having computer readable code thereon for providing automatic validation of test results using componentized software object reflection, the medium comprising:
instructions for running an application, said running an application resulting in the generation of at least one data structure, wherein the at least one data structure comprises a data structure written in a high-level programming language;
instructions for generating at least one resultant data structure from the at least one data structure, wherein the at least one resultant data structure comprises at least one markup language formatted data structure;
instructions for converting the at least one resultant data structure into at least one componentized software object, wherein the at least one componentized software object includes at least one field containing a value;
instructions for obtaining results from the at least one componentized software object, wherein the obtaining results from the at least one field of the at least one componentized software object comprises using reflection to obtain the results from the at least one componentized software object, and to validate any software structures produced by a program written in the high-level language; and
instructions for verifying the results from the at least one componentized software object.

9. The non-transitory computer readable medium of claim 8 wherein the instructions for generating at least one resultant data structure from the at least one data structure comprises instructions for converting the at least one data structure into at least one markup language formatted data structure.

10. The non-transitory computer readable medium of claim 9 wherein said instructions for converting the at least one resultant data structure into at least one componentized software object is performed by a validation program.

11. The non-transitory computer readable medium of claim 8 wherein said instructions for generating at least one resultant data structure is performed by a test program.

12. The non-transitory computer readable medium of claim 8 wherein the instructions for using reflection to obtain the results from the at least one componentized software object comprises instructions for looking up fields in the at least one componentized software object and checking the values in the fields.

13. The non-transitory computer readable medium of claim 8 wherein at least one data structure comprises a C data structure, and wherein said at least one resultant data structure comprises an Extensible Markup Language (XML) data.

14. The non-transitory computer readable medium of claim 8 wherein said componentized software object comprises a Java® component.

15. A computer system comprising:
a memory;
a processor;
a communications interface;
an interconnection mechanism coupling the memory, the processor and the communications interface; and
wherein the memory is encoded with an application providing automatic validation of test results using componentized software object reflection that when performed on the processor, provides a process for processing information, the process causing the computer system to perform the operations of:
running an application, said running an application resulting in the generation of at least one data structure, wherein the at least one data structure comprises a data structure written in a high-level programming language;
generating at least one resultant data structure from the at least one data structure, wherein the at least one resultant data structure comprises at least one markup language formatted data structure;
converting the at least one resultant data structure into at least one componentized software object, wherein the at least one componentized software object includes at least one field containing a value;
obtaining results from the at least one componentized software object, wherein the obtaining results from the at least one componentized software object comprises using reflection to obtain the results from the at least one field of the at least one componentized software object, and to validate any software structures produced by a program written in the high-level language; and
verifying the results from the at least one componentized software object.

16. The computer system of claim 15 wherein the generating at least one resultant data structure from the at least one data structure comprises converting the at least one data structure into at least one markup language formatted data structure.

17. The computer system of claim 16 wherein said converting the at least one resultant data structure into at least one componentized software object is performed by a validation program.

18. The computer system of claim 15 wherein said generating at least one resultant data structure is performed by a test program.

19. The computer system of claim 15 wherein the using reflection to obtain the results from the at least one componentized software object comprises looking up fields in the at least one componentized software object and checking the values in the fields.

20. The computer system of claim 15 wherein at least one data structure comprises a C data structure, and wherein said at least one resultant data structure comprises an Extensible Markup Language (XML) data structure.

21. The computer system of claim 15 wherein said componentized software object comprises a Java® component.

* * * * *